United States Patent
Taylor et al.

[11] Patent Number: 6,125,449
[45] Date of Patent: Sep. 26, 2000

[54] CONTROLLING POWER STATES OF A COMPUTER

[75] Inventors: Mark E. Taylor, Houston; Larry W. Kunkel, Spring; Gokalp Bayramoglu, Houston; Henry M. D'Souza, Cypress; Valiuddin Ali, Houston, all of Tex.

[73] Assignee: Compaq Computer Corporation, Houston, Tex.

[21] Appl. No.: 09/054,617

[22] Filed: Apr. 3, 1998

Related U.S. Application Data

[63] Continuation-in-part of application No. 08/884,709, Jun. 30, 1997.

[51] Int. Cl.[7] .................. G06F 1/26; G06F 1/32; G09G 1/00
[52] U.S. Cl. .......... 713/310; 713/320; 713/323; 345/212
[58] Field of Search .................. 713/300, 324, 713/340, 321, 323, 310; 365/228; 361/679, 115; 327/198; 345/212; 307/66; 710/62, 63, 129, 260

[56] References Cited

U.S. PATENT DOCUMENTS

| | | |
|---|---|---|
| 4,598,383 | 7/1986 | Leach ................................. 713/300 |
| 5,511,205 | 4/1996 | Kannan et al. . |
| 5,513,359 | 4/1996 | Clark et al. . |
| 5,598,567 | 1/1997 | Ninomiya ................................. 713/310 |
| 5,675,364 | 10/1997 | Stedman et al. . |
| 5,748,972 | 5/1998 | Clark et al. ................................. 713/323 |
| 5,764,547 | 6/1998 | Bilich et al. ................................. 713/321 |
| 5,790,873 | 8/1998 | Popper et al. ................................. 713/300 |
| 5,805,401 | 9/1998 | Schuellein et al. ................................. 361/92 |
| 5,832,280 | 11/1998 | Swanberg . |
| 5,838,982 | 11/1998 | Cooper et al. ................................. 713/300 |
| 5,872,515 | 2/1999 | Ha et al. . |

*Primary Examiner*—Gopal C. Ray
*Attorney, Agent, or Firm*—Paul N. Katz; Ronald L. Chichester; Frohwitter

[57] ABSTRACT

Method and apparatus of controlling a power state of a computer, the computer being connected to a monitor having a power control button. The computer is connected to the monitor over a video cable, and activation of the power control button is communicated to the computer over a wire in the video cable. In response to the activation signal, a system management interrupt is generated to invoke an SMI handler to change the power state of the computer. The power states of the computer include an ON state, an intermediate power state (such as Sleep state), and a suspend state (such as Soft-Off state).

48 Claims, 10 Drawing Sheets

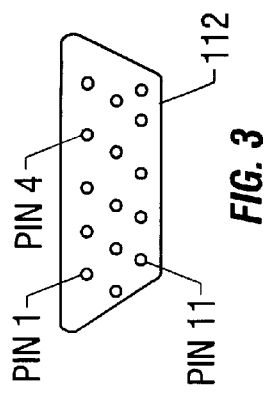
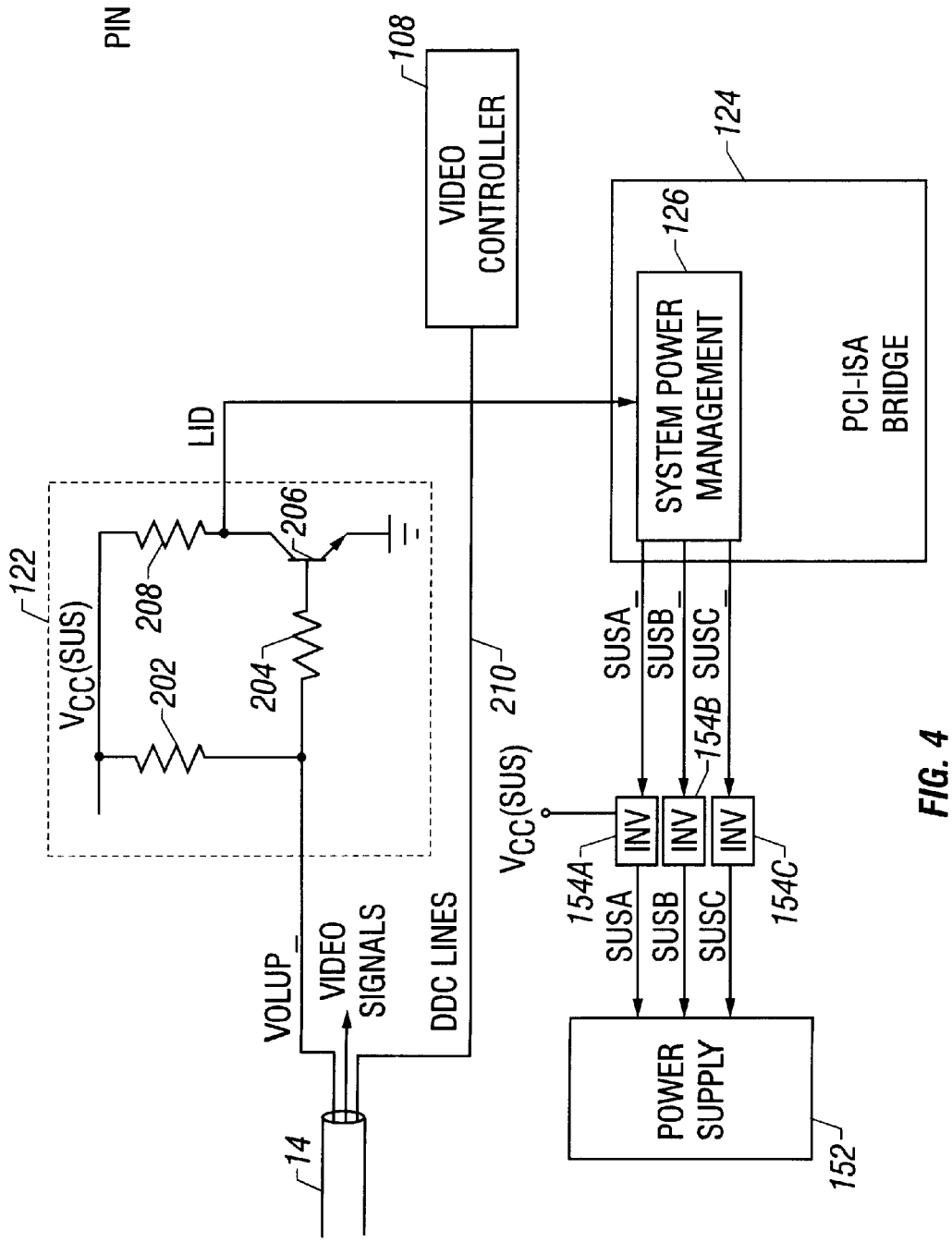

CONTROLLING POWER STATES OF A COMPUTER

CROSS-REFERENCE TO RELATED APPLICATIONS

This application is a continuation-in-part of U.S. patent application Ser. No. 08/884,709, filed Jun. 30, 1997, entitled "Controlling A Computer's Power State."

BACKGROUND

The invention relates to controlling power states of a computer.

The main power switch, located on a computer's housing, has typically been used to power the computer on and off. In a continuing effort to make it more convenient for a user to control the power state of a computer and to reduce power consumption, other ways of powering down the computer have been developed. For example, the Advanced Power Management (APM) (Version 1.2) standard has defined various low power states (including suspend states and intermediate power savings states) that the computer can transition to. Operating systems (such as Windows® from Microsoft Corporation) that support an APM suspend state (e.g., Soft-Off) allow a user to place the computer into the Soft-Off state directly from the graphical user interface of the operating system (such as from the Start menu in the Windows 95® user interface).

An example of a hardware device that can cooperate with the Windows® operating system to control the computer's power states is the 82371AB PCI-TO-ISA/IDE XCELERATOR (PIIX4) sold by Intel Corporation, which includes a system power management controller to manage transitions of the computer power state, including the Soft-Off state.

However, in addition to use of an operating system interface, other mechanisms for controlling the computer system's power state are needed to increase user convenience in placing a computer system into a reduced power state.

SUMMARY

In general, in one aspect, the invention features a method of controlling a power state of a computer, the computer being connected to a monitor having a power control button. Activation of the monitor power control button is received, and the power state of the computer is changed in response to activation of the monitor power control button.

In general, in another aspect, the invention features a method of controlling a power state of a computer, the computer being connected by a VGA cable to a monitor having a power control button. An activation signal is received over a wire in the VGA cable in response to activation of the monitor power control button. A system management interrupt is generated in response to receipt of the activation signal. A system management interrupt handler is invoked to change the power state of the computer. The computer includes an ON state, an intermediate power state, and a suspend state.

In general, in another aspect, the invention features a computer system including a monitor having a power button and a power management controller coupled to the monitor. The power management controller is configured to change the power state of the computer system in response to activation of the monitor power button.

In general, in another aspect, the invention features a computer system having a power control switch and a power management controller. The power management controller is connected to receive activation of the power control switch, the power management controller capable of placing the computer system into one of a Sleep state and a Suspend state.

In general, in another aspect, the invention features a computer system including a power controller that transitions the computer system to a predetermined low power state and sets a flag in non-volatile memory in response to a predefined event. A routine that reads the state of the flag when the computer system is restarting from a power off condition determines whether to transition the computer system in the predetermined low power state.

In general, in another aspect, the invention features a computer system including an actuatable input device, wherein actuation of the input device causes generation of a predetermined interrupt. An interrupt handler that is invoked in response to the predetermined interrupt is configured to periodically exit and re-invoke itself for as long as the input device is actuated.

In general, in another aspect, the invention features a computer system including an actuatable input device, wherein actuation of the input device causes generation of an interrupt. An interrupt handler that is invoked in response to the interrupt to transition the computer to one of at least two low power states depending on whether the actuatable input device has been actuated for greater than a predetermined time period. A timer (which can be part of the interrupt handler) expires after the predetermined time period. The interrupt handler transitioning to the one of at least two power states after the timer expires.

Other features will become apparent from the following description and from the claims.

BRIEF DESCRIPTION OF THE DRAWINGS

FIG. 3 is a front view of a video graphics adaptor connector.

FIG. 4 is a schematic diagram of power control circuitry in the computer.

DETAILED DESCRIPTION

A computer has several power states, including an ON state, an intermediate power state, a suspend state, and a hard OFF state. One example of an intermediate power state is the Sleep state, in which various system clocks are shut down to conserve power. In the suspend state (such as the Soft-Off state), many of the computer's power supply voltages are disabled. In the hard OFF state, all power supply voltages are disabled. Other intermediate power states and suspend states exist, including low power states defined in the Advanced Power Management (APM) standard.

Using a Monitor Button to Control the Computer's Power State

According to an embodiment of the invention, the power state of the computer can be controlled using a control button on a computer's monitor (e.g., Sleep button) connected to the computer by a video cable, e.g., a video graphics adaptor (VGA) cable. To avoid adding wires between the computer and monitor, an existing wire in the VGA cable is used to communicate an activation signal representing the state of the monitor's Sleep button.

Alternatively, activation of the SLEEP signal can be transmitted over a serial bus connecting the monitor and computer. The activation signal is transmitted to a power management controller located in the computer to switch the computer into one of three power states: ON, intermediate (e.g., Sleep), and suspend (e.g., Soft-Off).

Embodiments of the invention may have one or more of the following advantages. By using a power switch located on a computer's monitor to control a power state of the computer, a user is provided a more convenient means of switching the state of the computer. The power control is accomplished using the existing wires of the video cable connecting the computer and monitor, thereby avoiding adding signal lines between the computer and the monitor.

The following description discusses circuitry and steps of programs to transition the computer between the Soft-Off and Sleep states. Similar circuitry and steps can be used to transition the computer between other suspend and intermediate power states.

Figure 1:
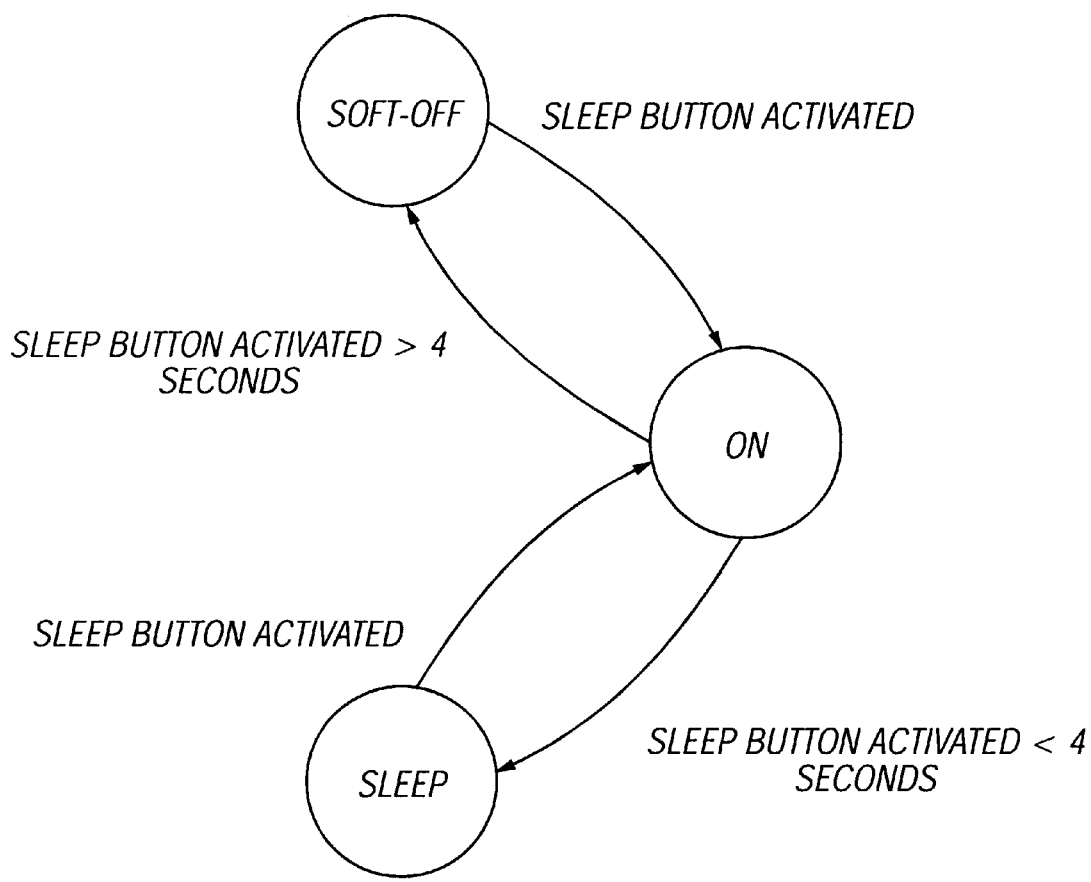
FIG. 1 is a state diagram illustrating several different states of a computer.

Referring to FIG. 1, if the computer is in either of the Soft-Off or Sleep states, activation of the Sleep button on the monitor causes the power management controller to transition the computer to the ON state. Once in the ON state, the computer can transition back to either the Sleep state or the Soft-Off state, depending on how long the user activates the Sleep button. If the Sleep button is activated less than a predetermined time period (e.g., 4 seconds), the power management controller causes the computer to transition to the Sleep state; otherwise, if the Sleep button is pressed for greater than or equal to the predetermined time period, the power management controller causes the computer to transition to the Soft-Off state.

Software, such as a system management interrupt (SMI) handler, is used to transition the computer out of either the ON or Sleep states, as the computer is powered on in these states and all necessary software, including device drivers, remain available. A hardware reset (to reboot the computer) is used to transition the computer out of the Soft-Off state, as most of the components of the computer are powered down in this state.

Figure 2:
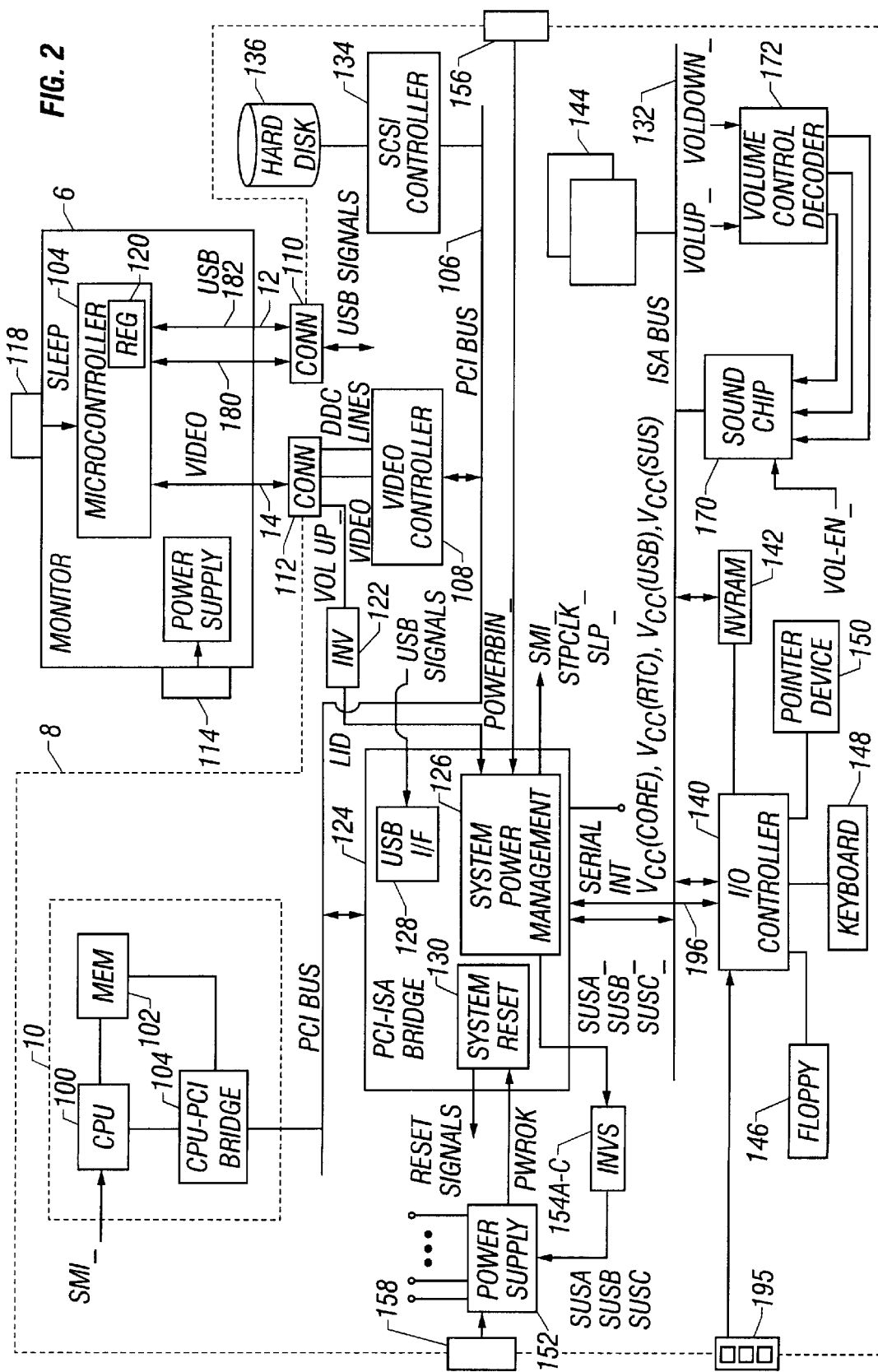
FIG. 2 is a block diagram of a computer connected to a display monitor.

Referring to FIG. 2, a computer 8 is connected to a monitor 6 by a Universal Serial Bus (USB) cable 12 and a video cable 14 (such as a video graphics adaptor or VGA cable) through two connectors 110 and 112, respectively. Video signals are communicated between the computer 8 and the monitor 6 over the VGA cable 14. The USB cable 12 can be used to communicate other types of information (e.g., configuration data and control data) between the monitor 6 and the computer 8.

The monitor 6 has two power management buttons: a main power button 114 connected to the monitor's power supply 116; and a Sleep button 118 connected to provide a SLEEP signal to a microcontroller 104. Pressing the power button 114 shuts down the power supply 116, thereby cutting off power to all components in the monitor 6. The Sleep button 118 can be activated by the user to transition the computer 8 to one of several states: ON, Sleep, and Soft-Off.

The microcontroller 104, running under control of firmware, can transmit activation of the Sleep button over either the USB cable 12 or the VGA cable 14, or both, depending upon the states of power control bits in a microcontroller configuration register 120.

In the computer 8, all video signals, except for one, in the VGA cable 14 are routed through the connector 112 to a video controller 108 in the computer 8. The video signals include the HSYNC and VSYNC synchronization signals provided to the monitor by the video controller 108. When the computer 8 is placed into either the intermediate power state (e.g., Sleep) or the suspend state (e.g., Soft-Off), the HSYNC and VSYNC signals are disabled by the video controller 108 to blank the monitor screen.

The remaining signal (designated VOLUP_) in the VGA cable 14 is routed to an inverter 122, which drives a signal LID to a PCI-ISA bridge 124 (such as the 82371AB PCI-TO-ISA/IDE XCELERATOR or PIIX4 chip from Intel Corporation). The LID input is provided to a system power management controller 126 in the PCI-ISA bridge 124. The system power management controller 126 performs various power management functions in the computer 8, as discussed in greater detail below.

Separately, the USB signals in the USB cable 12 are routed through the connector 110 to a USB interface controller 128 in the PCI-ISA bridge 124. The USB cable 12 includes a serial line 182 and a power line 180. The serial line 182 is used to communicate control and data bits. The power line 180 is activated to a high voltage state (e.g., 5 volts) when the computer 8 is on or in Sleep mode. The power line 180 is low if the computer 8 is in Soft-Off mode.

The PCI-ISA bridge 124 controls communications between a Peripheral Component Interconnect (PCI) bus 106 and an Industry Standard Architecture (ISA) bus 132. Also connected to the PCI bus 106 are the video controller 108, a SCSI controller 134, and a CPU-PCI bridge 104. The CPU-PCI bridge 104 is connected on its other side to a CPU (central processing unit) 100 and to a main memory 102. The SCSI controller 124 is connected to a hard disk drive 136.

In addition, an input/output (I/O) controller 140, a non-volatile random access memory (NVRAM) 142, and ISA slots 144 are connected to the ISA bus 132. The I/O controller 140 provides interface ports to a floppy disk drive 146, a keyboard 148, and a pointer device 150. The I/O controller also includes a control circuit for the NVRAM 142, which can be implemented with an electrical erasable programmable read-only memory (EEPROM) or flash memory. Basic input/output system (BIOS) routines are stored in the NVRAM 142, which are invoked during the power-up sequence of the computer as well as in response to power management calls made by the operating system running on the computer 8.

A power supply 152 provides various supply voltages to other components in the computer 8, including supply voltages VCC(CORE), VCC(RTC), VCC(SUS), and VCC (USB) connected to the PCI-ISA bridge 124. The different VCC signals power various parts of the PCI-ISA bridge 124, with the VCC(CORE) voltage supplied to the majority of the components in the PCI-ISA bridge 124, the VCC(RTC) voltage applied to the real time clock, the VCC(SUS) voltage supplied to the system power management controller 126, and the voltage VCC(USB) supplied to the USB interface controller 128.

Alternatively, the voltages VCC(USB) and VCC(CORE) can be the same voltage.

The power supply 152 generates a signal PWROK to indicate when the power supply voltages in the computer 8 have stabilized at their predefined levels, e.g. about 3.3 volts for VCC(CORE), VCC(RTC), VCC(SUS), and VCC(USB). The system power management controller 126 in the PCI-ISA bridge 124 provides a suspend signal SUSC_ to an inverter 154, which in turn drives a signal SUSC to the power supply 152. The inverter 154 is all connected to the supply voltage VCC(SUS). The SUSC signal is activated to place the computer 8 into the Soft-Off mode and cause the power supply 152 to disable all power voltages except for VCC(RTC) and VCC(SUS) to the PCI-ISA bridge 124. When the computer is off, the voltage VCC(RTC) is actually sourced by a lithium battery.

The system power management controller 126 also receives a signal POWERBTN_ from a power Bezel button 156 located on the housing of the computer 8. In response to activation of the POWERBTN_ signal, the system power management controller 126 can place the computer 8 to either the Sleep state or the Soft-Off state. Activation of the power Bezel button 156 for less than 4 seconds causes the computer 8 to transition to the Sleep state while activation of the power Bezel button 156 for 4seconds or more causes a hardware power button override in the PCI-ISA bridge 124 (such as the PIIX4 chip power button override) to place the system in the Soft-Off state.

A separate, main power button 158 located on another part of the computer housing switches the computer completely on or off. When switched off, the power supply 152 disables all voltage signals in the computer 8 except VCC(RTC) for the real time clock.

A further mechanism for the user to control the power state of the computer is through the graphical user interface of the operating system (e.g., Windows 95®). In the Windows 95® interface, the user can select the Start menu to shut down the computer. If the user specifies the shut-down command, the computer 8 invokes various routines to cause the system power management controller 126 and the PCI-ISA bridge 124 to activate the suspend signal SUSC_ to disable various voltages generated by the power supply 152.

Use of the Sleep button 118 (or another suitable control button) on the monitor 6 to control the power state of the computer 8 is described below in greater detail. The state of the Sleep button 118 is transmitted either over the VGA cable 14 or the USB cable 12 by the microcontroller 104 depending upon the states of the power control bits in the configuration register 120 in the microcontroller 104. The contents of the configuration register 120 can be set over the USB cable 12 by software running on the computer 8. The software controls the USB interface controller 128 in the PCI-ISA bridge 124 to perform a sequence of cycles on the USB bus 12 to write the appropriate bits into the configuration register 120.

Figure 5A:
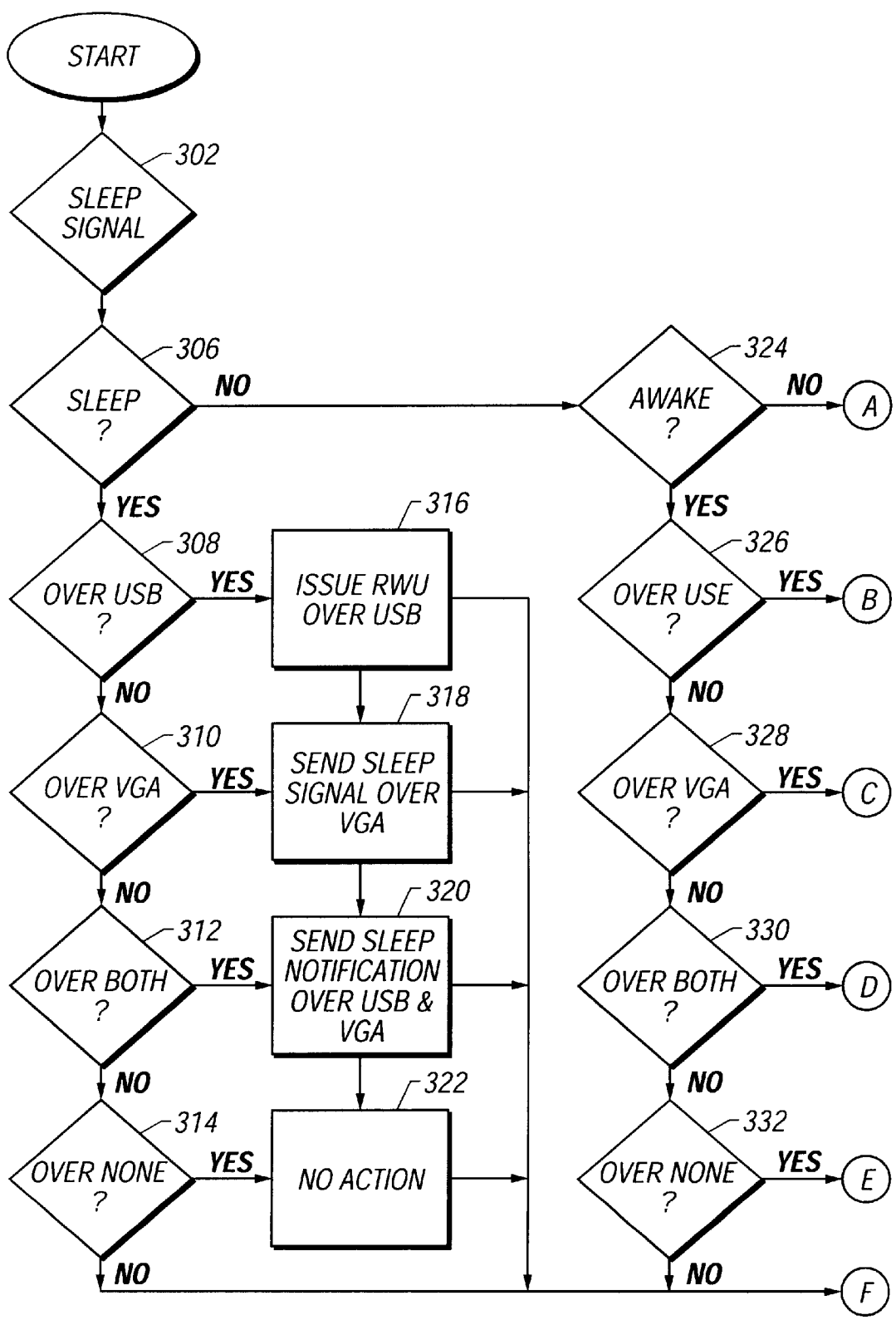
FIGS. 5A and 5B is a flow diagram of firmware for controlling a microcontroller in the display monitor.
Figure 5B:
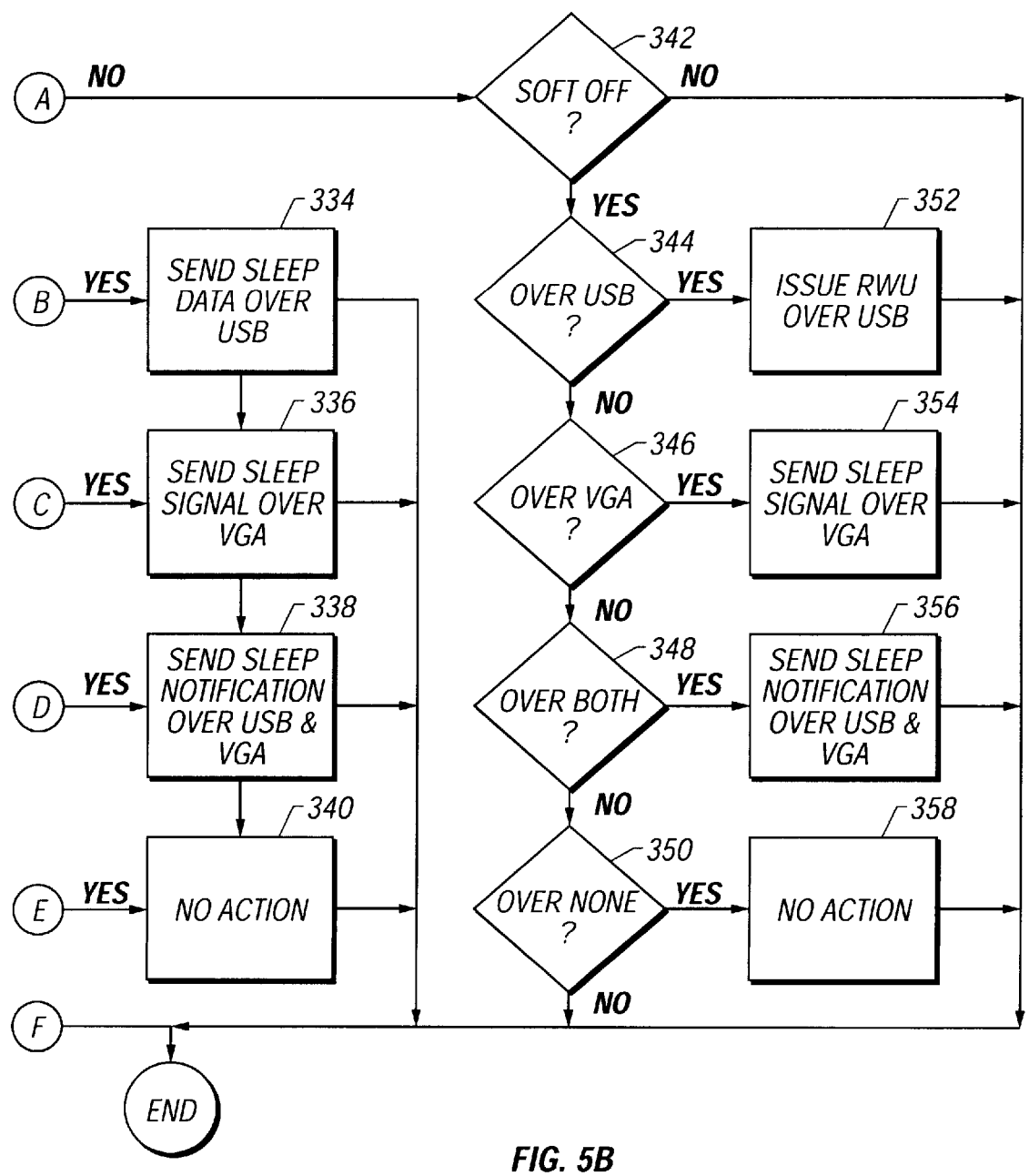

Referring to FIG. 5A and FIG. 5B, the microcontroller 104 in the monitor 6 is run under control of firmware, which determines whether the signal SLEEP is routed over the USB cable 12 or the VGA cable 14. The firmware checks at step 302 whether the signal SLEEP is asserted. What the firmware does next depends upon the state of the computer 8. If the firmware determines at step 306 that the computer 8 is in Sleep state, then it performs one of steps 316, 318, 320, or 322. Before the computer 8 enters into Sleep mode, the USB interface controller 128 in the PCI-ISA bridge 124 sends a sleep notification over the USB cable 12, which is stored by the microcontroller 104 as a sleep bit in an internal register (not shown). If the stored sleep bit is active and the USB power line 180 is active (at 5 volts), then the computer 8 is determined to be in Sleep mode.

The firmware determines at steps 308, 310, 312 and 314 whether the SLEEP signal is to be transmitted over the USB cable 12, VGA cable 12, both cables, or neither cable. If over the USB cable, a USB resume command is transmitted. If over the VGA cable 14, the SLEEP signal is routed over wire 4 of the VGA cable (as shown in FIG. 3) and passed through the VGA connector 112 as the signal VOLUP_. If the sleep indication is to be sent over both cables 12 and 14, then activation of the SLEEP signal is sent over the USB cable and wire 4 in the VGA cable is activated. If the sleep indication is to be sent over neither cable, then no action is taken.

If the computer 8 is determined to be in the ON state (the stored sleep bit is low and the USB power line 180 is active), then one of the steps 334, 336, 338, and 340 is performed, depending on whether the sleep indication is to be transmitted over the USB cable, the VGA cable, both cables, or neither cable, as determined at steps 326, 328, 330, and 332. A sleep command is sent over the USB cable 12, and/or the SLEEP signal is activated over wire 4 of the VGA cable.

Finally, if the computer 8 is determined to be in the Soft-Off mode (the USB power line 180 is inactive), then one of steps 352, 354, 356, and 358 is performed, depending on which cables are to be used for notification as determined at steps 344, 346, 348, and 350. A resume command is sent over the USB cable, and the SLEEP signal is activated over wire 4 of the VGA cable.

If the PIIX4 controller is used, however, transmission of the resume command over the USB cable is ignored if the computer is in the Soft-Off mode, since the USB interface controller 128 is powered down. To take advantage of the ability to route activation of the SLEEP signal over the USB bus, the voltage VCC (USB) would be maintained to the USB interface controller 128, which would decode a resume or sleep command received over the USB bus from the monitor 6 and respond by invoking power management routines to control the state of the computer 8.

Described below is the implementation in which the activation of the SLEEP signal is routed over the VGA cable. However, the described implementation can be easily modified and extended to communication of the SLEEP signal over the USB bus.

Referring to FIG. 4, in the computer 8, the signal VOLUP_ from the VGA cable 14 is routed to the inverter 122, which includes an NPN transistor 206 having its base connected through a resistor 204 to receive the signal VOLUP_ and its emitter connected to ground. The collector of the transistor 206 is connected through a resistor 208 to the power supply voltage VCC (SUS), which is not disabled during Soft-Off mode. A resistor 202 is further connected between VCC (SUS) and the signal VOLUP_. In addition to acting as an inverting buffer for the signal VOLUP_ from the VGA cable 14, the circuitry of the inverter 122 also provides overvoltage protection in case the monitor 6 connected to the computer 8 is a monitor that does not support routing the SLEEP signal over the VGA cable.

The inverter 122 outputs the signal LID, which is provided to the LID_ input of the PCI-ISA bridge 124. As the signal LID is a non-inverted signal (i.e., active high), the LID polarity bit (LID_POL) in a configuration register in the PCI-ISA bridge 124 is set to indicate a non-inverting polarity at the LID_ input. This is further described in Intel Corporation, 82371AB PCI-TO-ISA/IDE XCELERATOR (PIIX4) Specification (April 1997), which is hereby incorporated by reference in its entirety.

For purposes of identifying the type of monitor connected to the computer 8, digital data channel (DDC) lines 210 in the VGA cable 14 connected to the video controller 108 are used. The DDC lines 210 are connected to a monitor-type configuration register (not shown) in the monitor 6 that stores a value indicating the type of monitor. During the power-up sequence, the system BIOS routine checks the value of this configuration register over the DDC lines 210 to determine if the monitor supports routing the SLEEP signal over the VGA cable 14 (referred to as a "power control-type monitor").

Figure 6:
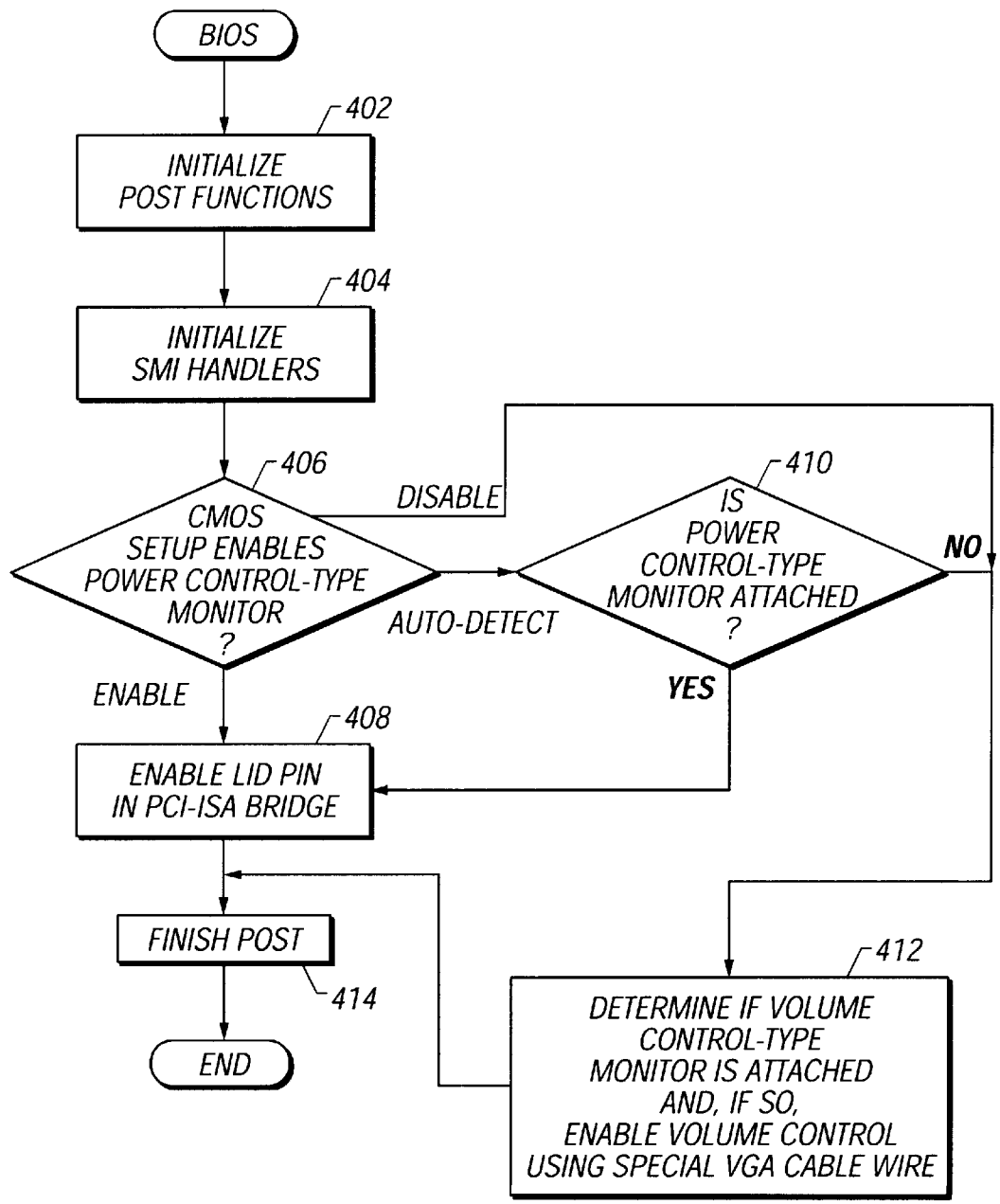
FIG. 6 is a flow diagram of a BIOS routine to enable the power control feature of the computer.

Referring to FIG. 6, a system BIOS routine is invoked during POST (power on self-test) in the computer boot process. At step 402, the BIOS routine performs initial POST functions. Next, at step 404, the BIOS routine initializes SMI handlers by copying them from the NVRAM 142 to SMRAM, located in the main memory 102.

Next, at step 406, the BIOS routine determines if the user has explicitly enabled a power control-type monitor in CMOS setup. The user can enter the CMOS setup screen by hitting a predefined key (e.g., F10 key) during POST, which allows the user to select one of three options with respect to a power control-type monitor field: ENABLE, DISABLE, or AUTODETECT. If the user specifies ENABLE, then the computer 8 treats the monitor 6 as a power control-type monitor. If the user specifies DISABLE, then the computer 8 treats the monitor 6 as a non-power control-type monitor. If the user specifies AUTODETECT, then the computer 8 performs automatic detection to determine the type of monitor over the DDC lines 210.

Thus, at step 406, if the CMOS set-up has enabled the power control-type monitor, then the BIOS routine proceeds to enable at step 408 the LID pin in the PCI-ISA bridge 124. The BIOS routine performs this by setting a lid enable (LID_EN) bit high in a general purpose enable register in the PCI-ISA bridge 124. A more detailed description of the configuration register set in the PIIX4 chip is described in the 82371AB PCI-TO-ISA/IDE XCELERATOR (PIIX4) Specification, referenced above. The BIOS routine then finishes the remaining POST functions at step 414.

If the CMOS setup specifies AUTODETECT, then the BIOS routine automatically determines at step 410 if the monitor connected to the computer 8 is a power control-type monitor. As explained above, this is performed by accessing the monitor-type configuration register in the monitor 6 over the DDC lines 210. If the BIOS routine determines that a power control-type monitor is attached, it enables at step 408 the LID pin in the PCI-ISA bridge 124.

If a power control-type monitor is not connected (either disabled in CMOS set-up or after a determination over the DDC lines 210), the BIOS routine at step 412 determines if a volume control-type monitor is attached. As described in U.S. application Ser. No. 08/667,582, filed Jul. 12, 1996, entitled "Controlling Multi-Media Aspects of a Computer" and having the same assignee as the present application, a computer monitor has a volume control knob on its housing connected to a volume control circuit (not shown) in the monitor. The co-pending application is hereby incorporated by reference. As explained in the application, the monitor volume control circuit is responsive to movement of the volume control knob and communicates decoded signals VOLUP_ and VOLDOWN_ (not shown) over the VGA cable 14, such as through pins 4 and 11 (FIG. 3). The signals are provided to a sound chip 170 connected to the ISA bus 132 to control the volume of sound emanating from speakers connected to the computer 8.

The volume control capability of the sound chip 170 is enabled by a signal VOL_EN_, which is set active (low) by the I/O controller 140 in response to enabling by the BIOS routine after the BIOS routine determines that a volume control-type monitor is attached to the computer 8 (at step 412). If a power-control type monitor or a standard monitor is attached to the computer 8, then the signal VOL_EN_ is deasserted (high) to disable the volume control feature.

If the lid enable (LID_EN) bit in the general purpose enable register of the PCI-ISA bridge 124 is set high, and the signal LID is asserted high by the inverter 122 (subject to up to a 4-ms debouncing by the system management controller 126), the system management controller 126 asserts the system management interrupt SMI_ to the CPU 100. This causes the CPU 100 to invoke an SMI handler.

Figure 7:
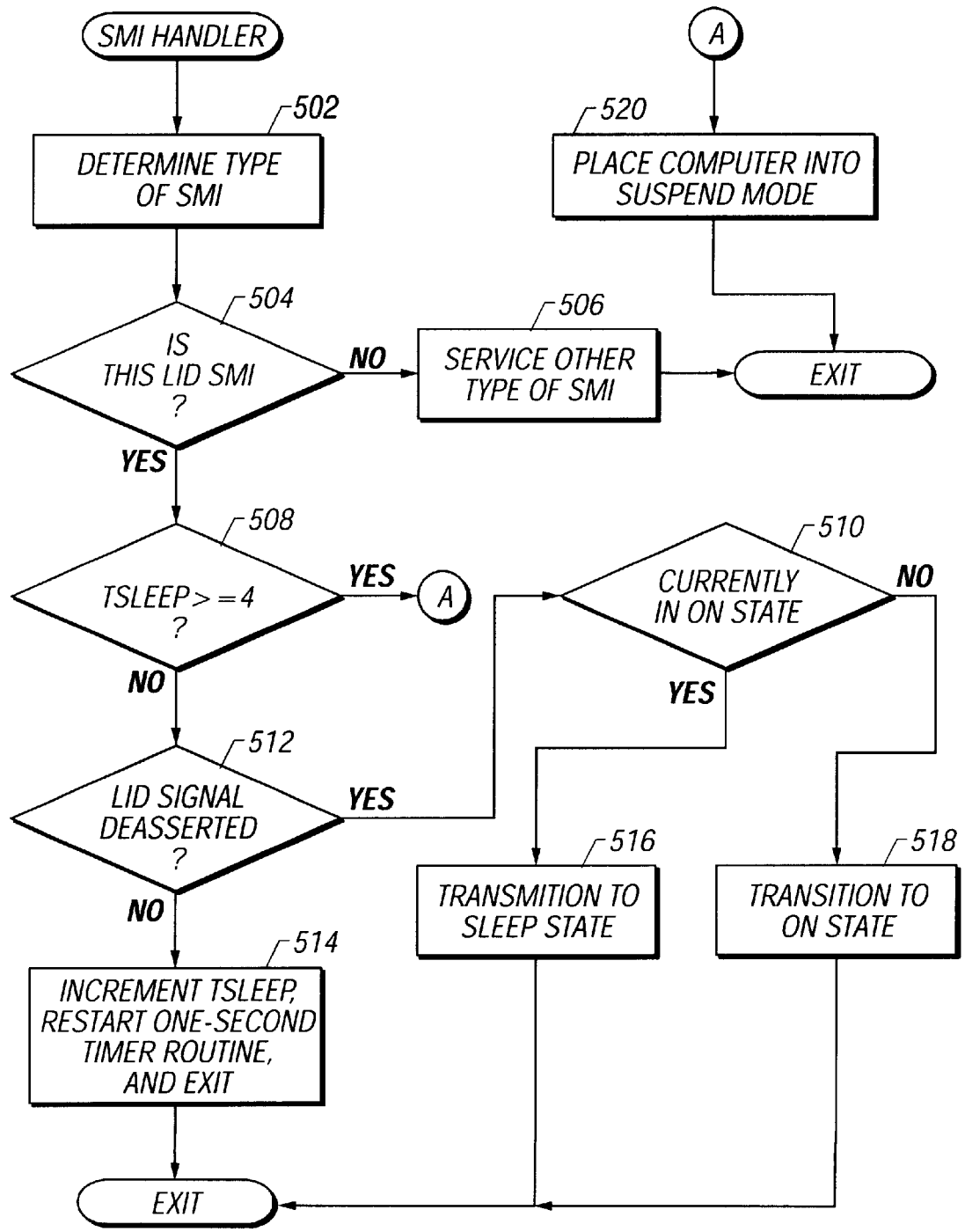
FIG. 7 is a flow diagram of a system management handler for controlling the computer's power state in response to activation of a control button on the computer's monitor.

Referring to FIG. 7, the SMI handler determines at step 502 the type of SMI that has been invoked. Whether the type of SMI handler is an LID SMI is indicated by an LID status bit (LID_STS) set high in the general purpose status register of the PCI-ISA bridge 124. If the event is not an LID SMI as determined by step 504, the SMI handler performs steps to service the other type of SMI at step 506 and exits.

If the event is an LID SMI, the SMI handler checks at step 508 whether a parameter TSLEEP is greater than 4, which represents that the user has pressed the Sleep button 118 on the monitor 6 for greater than or equal to 4 seconds. The user can place the computer 8 into either the Sleep state or the Soft-Off state, depending on how long the user presses the Sleep button 118 on the monitor 6. If the Sleep button 118 is pressed for less than the predetermined time period (e.g., 4 seconds) and released, the computer 8 is placed into the Sleep state; otherwise, if the Sleep button 118 is pressed for more than or equal to the 4 seconds (the "4-sec override"), the computer 8 is placed into the Soft-Off state. The parameter TSLEEP is initialized to the value one.

The 4-sec override used for the Sleep button 118 (which is coupled to the LID input of the system management controller 126) is performed in software. In contrast, the 4-sec override of the system management controller 126 is implemented in hardware (discussed further in connection with FIGS. 8 and 9).

To time the Sleep button 118, the SMI handler works with a one-second timer routine. To avoid staying in SMI for 4 seconds, which is undesirable since all other interrupts in the computer 8 are masked during an SMI event, the SMI handler exits after it invokes this one-second timer routine to count the one-second time period. After the one-second timer routine finishes counting one second, it reinvokes the LID SMI handler.

This process is shown by steps 508, 512, and 514 of the SMI handler in FIG. 7. If the parameter TSLEEP is not greater than or equal to 4 (TSLEEP is initialized to 1), then 4 seconds have not elapsed during which the user is continuously pressing the Sleep button 118, then the SMI handler checks at step 512 if the LID signal has been deasserted by checking the LID status bit (LID_STS) in the general purpose status register of the PCI-ISA bridge 124. If the LID signal remains asserted (indicating that the Sleep button 118 is still being pressed by the user), the SMI handler at step 514 increments the parameter TSLEEP, restarts the one-second timer routine, and exits.

If, however, the LID signal is deasserted at step 512, the SMI handler can proceed to transition the computer into or out of Sleep state. At step 510, the SMI handler determines if it is currently in the ON state. If so, the SMI handler proceeds at step 516 to transition the computer 8 to Sleep state. In transitioning to the Sleep state, the SMI handler issues a call to the video controller 108 to shut off the HSYNC and VSYNC clocks to blank the monitor 6. However, if the computer is not currently in the ON state, that indicates that the computer 8 is in the Sleep state and the SMI handler proceeds to step 518 to transition the computer 8 back to the ON state.

In one embodiment, whether the PCI-ISA bridge 124 can transition the computer 8 into Sleep state depends upon control bits set in the processor control register in the PCI-ISA bridge 124. The processor control register includes a Sleep enable (SLEEP_EN) bit and a clock control enable (CC_EN) bit, which both are set high to enable Sleep state. If the CC_EN and SLEEP_EN bits are set, then the SMI handler can transition the computer 8 into Sleep state by performing a read of a processor level 3 (PLVL3) register in the PCI-ISA bridge 124. Reading this register causes the PCI-ISA bridge 124 to generate signals to cause the computer 8 to enter the Sleep state. In response to a read of the PLVL3 register, the power system management controller 126 in the PCI-ISA bridge asserts a signal STPCLK_, which causes the CPU 100 to issue a stop grant bus cycle. When the stop grant bus cycle is terminated, and after a predetermined number of PCI clock cycles on the PCI bus 106, the PCI-ISA bridge asserts its SLP_ signal. Various processor clocks are disabled to enter Sleep state. In addition, the video controller 108 shuts down the VSYNC and HSYNC signals to blank the monitor 6.

It is also possible to enter into other types of intermediate power states, such as the stop grant state, the stop clock state (if a Pentium II CPU is used), or a deep sleep state (if a Pentium II CPU is used). Each of these states corresponds to a unique combination of the CC_EN, SLEEP_EN, and STPCLK_EN bits in the processor control register of the PCI-ISA bridge 124. Thus, if desired, the processor control register can be programmed to enter one of these other states in response to the user pressing the Sleep button 118 for less than the predetermined time period.

Another intermediate power state is the power-on suspend (POS) mode, in which all devices are powered up except for the clock synthesizer in the PCI-ISA bridge 124. The host and PCI clocks are inactive and the PIIX4 chip provides control signals and 32-kHz suspend clock to allow for DRAM refresh and to turn off the clock synthesizer. The only power consumed in the system is due to DRAM refresh and leakage current of the powered up devices.

Alternatively, if the PCI-ISA bridge 124 does not include a clock synthesizer, the host and PCI clocks remain active but the clocks to the internal circuitry of the PCI-ISA bridge are stopped to conserve power. Entry into the POS mode is accomplished using SUS_EN and SUS_TYP bits in a power management control register of the PCI-ISA bridge 124, and is described in further detail below in connection with entering the suspend states.

The computer 8 can be taken out of the Sleep state and restored to full operation either by system hardware or software. The SMI handler, invoked in response to activation of the Sleep button 118 on the monitor 6, is one example of software that can bring the computer back to full operation by clearing the CC_EN bit in the processor control register of the PCI-ISA bridge 124.

If the one-second timer was restarted four times by the SMI handler in response to the user activating the Sleep button 118 on the monitor 6 for more than 4 seconds, the parameter TSLEEP will have counted to the value 4, and the SMI handler transitions to step 520 to place the computer into the Soft-Off mode.

The PIIX4 chip supports the Soft-Off and suspend to RAM (STR) suspend modes. In the STR mode, power is removed from most of the computer's components except the DRAM and the RTC and certain system power management circuitry in the PIIX4 chip.

Of the suspend modes, Soft-Off is the mode of least power consumption, in which power is maintained only to the RTC and certain of the system power management circuitry in the PIIX4 chip.

The type of suspend mode is enabled by setting the suspend type (SUS_TYP) bits in the power management control register of the PCI-ISA bridge 124 to a particular value. If the SUS_TYP bits are set to 000, then the Soft-Off mode is selected. A value of 001 selects the STR mode, respectively.

To initiate placing the computer 8 into the Soft-Off state at step 520, the SMI handler sets the SUS_EN bit and the appropriate value in the SUS_TYP bits in the power management control register of the PCI-ISA bridge 124. In response, the system power management controller 126 in the PCI-ISA bridge 124 asserts the signal SUSC_ to the inverters 154, which drives the signal SUSC to the power supply 152 to shut down all supply voltages except VCC (RTC) and VCC (SUS).

To enter the intermediate power POS state, the SMI handler would set the SUS_EN bit and write the value 100 into the SUS_TYP bits.

A hardware event that can cause the computer 8 to transition out of the Soft-Off state is activation of the SLEEP button 118 on the monitor 6, which causes the LID signal to be asserted by the inverter 122. In response to the assertion of the LID signal, the PCI-ISA bridge 124 deasserts the signal SUSC_ to allow the power supply 152 to bring all supply voltages to power-on levels. Once the supply voltages are stable and have reached proper power-on voltage levels, the power supply 152 asserts a signal PWROK to the PCI-ISA bridge 124 to indicate that the supply voltages have been powered on. The system reset controller 130 in the PCI-ISA bridge 124 then performs a reset (by asserting reset signals) of all of the components in the computer 8 to reboot the computer.

Use of Power Bezel Button to Control the Computer's Power State

The power Bezel button 156 can be used also to control the power state of the computer system 8. Activation of the power Bezel button 156 causes the signal POWERBTN_ to be activated. In the embodiment, if the power Bezel button 156 is held for less than a predetermined amount of time (e.g., 4 seconds), the system power management controller 126 causes the computer system 8 to transition to an intermediate power state, such as the POS state. If, however, the power Bezel button 156 is held for greater than or equal to the predetermined time period, a hardware power button override mechanism is activated in the system power management controller 126. In one embodiment, in response to activation of the power override, the system management controller 126 causes the system to enter a suspend state, e.g., the Soft-Off state.

The power button override function is implemented in hardware. As a result, once the system enters the Soft-Off state by this mechanism, no record is typically kept that the computer system 8 has entered Soft-Off state. Thus, if the computer system 8 was to be completely powered off for some reason (e.g., the main power button 158 is switched to the off position, a power surge occurs, or the AC power line to the computer system 8 is disconnected), the system software layers (such as the system BIOS) would not be aware that the system 8 was previously in a Soft-Off state.

If the software layers of the computer system 8 are unaware of the prior Soft-Off state, loss of power and subsequent power on (a power cycle) will cause the computer system 8 to reboot to the ON state.

To avoid this condition, a Soft-Off flag is set in non-volatile memory, such as CMOS memory (which can be located in the I/O controller 140 or in a separate storage device) or in the NVRAM 142, to indicate that the system has entered Soft-Off mode.

Figure 8:
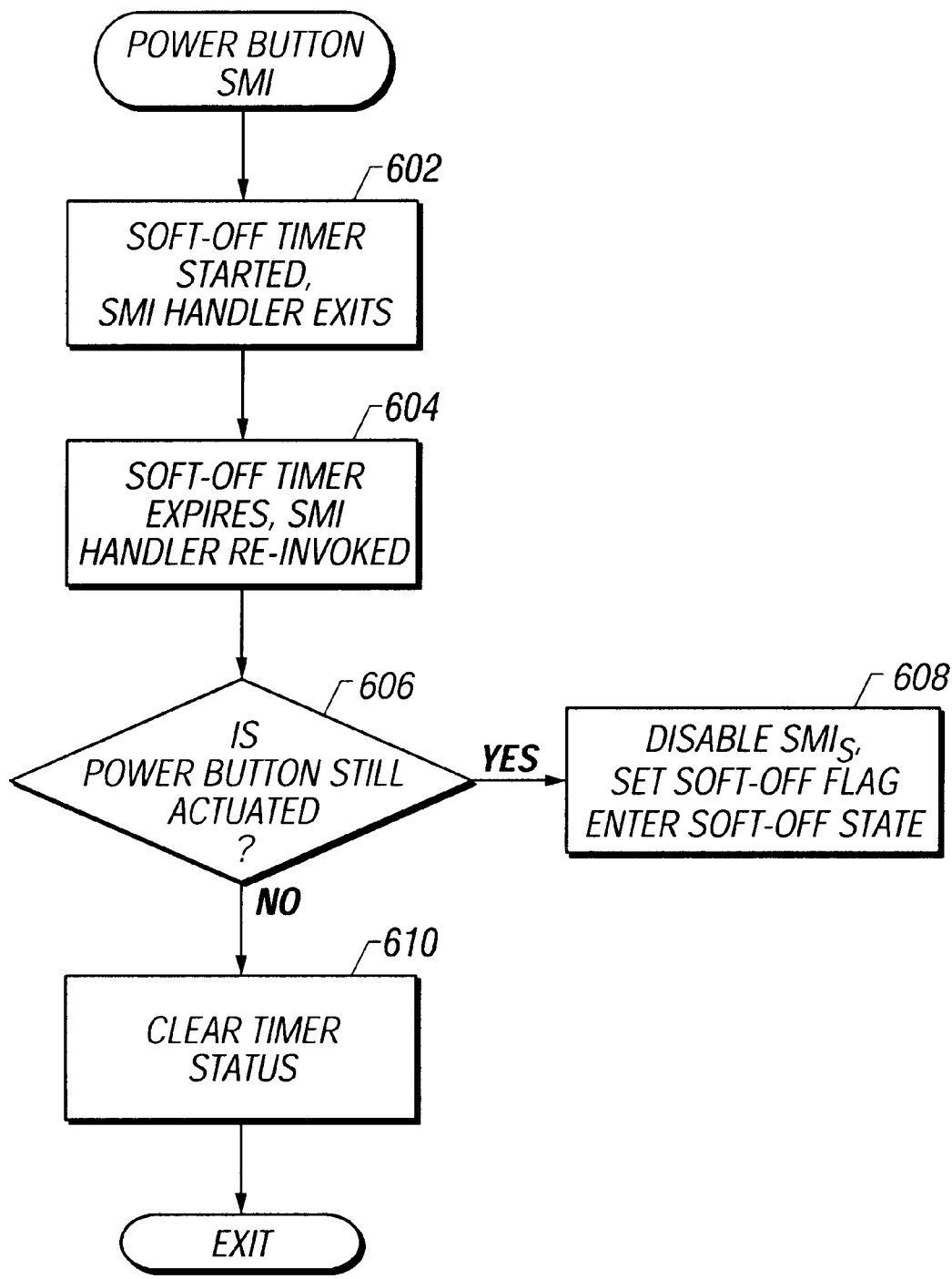
FIG. 8 is a flow diagram of a system management handler for detecting if the computer has transitioned to a predetermined power state in response to activation of a power control button.

Referring to FIG. 8, when the power Bezel button 156 is depressed to activate POWERBTN_, a system management interrupt (SMI) is generated to invoke an SMI handler (power button SMI handler) according to an embodiment of the invention. The power button SMI handler can be part of the system BIOS (e.g., APM BIOS).

The power button SMI handler starts a timer that expires after a predefined time, e.g., 3.5 seconds (step 602). The timer can be a software timer (which can be implemented in the SMI handler itself or in system BIOS), and is referred here as the Soft-Off timer. The SMI handler then exits.

When the 3.5-sec timer expires, the power button SMI handler is invoked again (step 604). The SMI handler determines if the power Bezel button 156 is till being depressed (step 606). The SMI handler determines this by reading a stored value in the system power management controller 126 that is set or cleared depending upon activation or deactivation of POWERBTN_. If the stored value is set, this indicates that the user wants to go into Soft-Off mode, and the SMI handler sets the Soft-Off flag stored in non-volatile memory (step 610).

However, if the SMI handler detects at step 606 that the POWERBTN_ has been released, then the Soft-Off timer is cleared and the SMI handler exits.

On the next system boot, the Soft-Off flag in non-volatile memory is checked to determine if the system 8 was previously in Soft-Off mode. If the Soft-Off flag is set, then the system BIOS places the system 8 back in Soft-Off state after the boot process has completed. If the Soft-Off flag is cleared, then the system BIOS boots the computer 8 to its ON state. From the Soft-Off state, the computer system 8 can transition to the ON state only after reactivation of the power Bezel button 156.

The Soft-Off flag stored in non-volatile memory can also be set by the SMI handler in response to other events, such as activation of the Sleep button 118 on the monitor for greater than the predetermined period of time (e.g., 4 seconds) to place the system 8 into Soft-Off state.

An advantage offered by this feature is that the system 8 can be maintained in a power savings state, such as the Soft-Off state, even after the system is powered off and restarted. This enhances power savings in the computer system 8.

In embodiments discussed in connection with FIG. 8 above, the system BIOS and SMI handler is aware that the power Bezel button 156 is being pressed down and to react accordingly. However, if the system BIOS or SMI handler is not configured to detect if the power Bezel button 156 is pressed for an extended time period, then a mechanism is needed to ensure that the computer system 8 transitions to the proper state when the power Bezel button 156 is actuated for the predetermined time period.

Upon initial activation of the Bezel button 156, POWERBTN_ is activated and the system power management controller 126 generates an SMI. This is an indication that the user is requesting that the system 8 enter one of two modes: an intermediate power state such as POS mode (if the button 156 is pressed for less than 4 seconds); and a suspend state such Soft-Off mode (if the button 156 is pressed for 4 seconds or more). In response, the power button SMI handler is invoked. Such an SMI handler can be the Advanced Power Management (APM) BIOS routine. However, since the SMI handler is unable to determine if the power Bezel button 156 for the predetermined time period (e.g., 4 seconds), a delay timer is used to determine which low power state to transition to. This is advantageous particularly in a computer system 8 which is unable to transition from one low power state to another. Thus, for example, in such a system, if the system transitions to the POS state, it will be unable to transition to the Soft-Off state even after the power Bezel button 156 has been pressed for the predetermined time period. Thus, the delay timer can be used to prevent the system 8 from prematurely entering an intermediate power state, such as the POS state, if the user in fact is attempting to enter a suspend state, such as the Soft-Off state, by depressing the power control button for greater than the predetermined time period.

Figure 9:
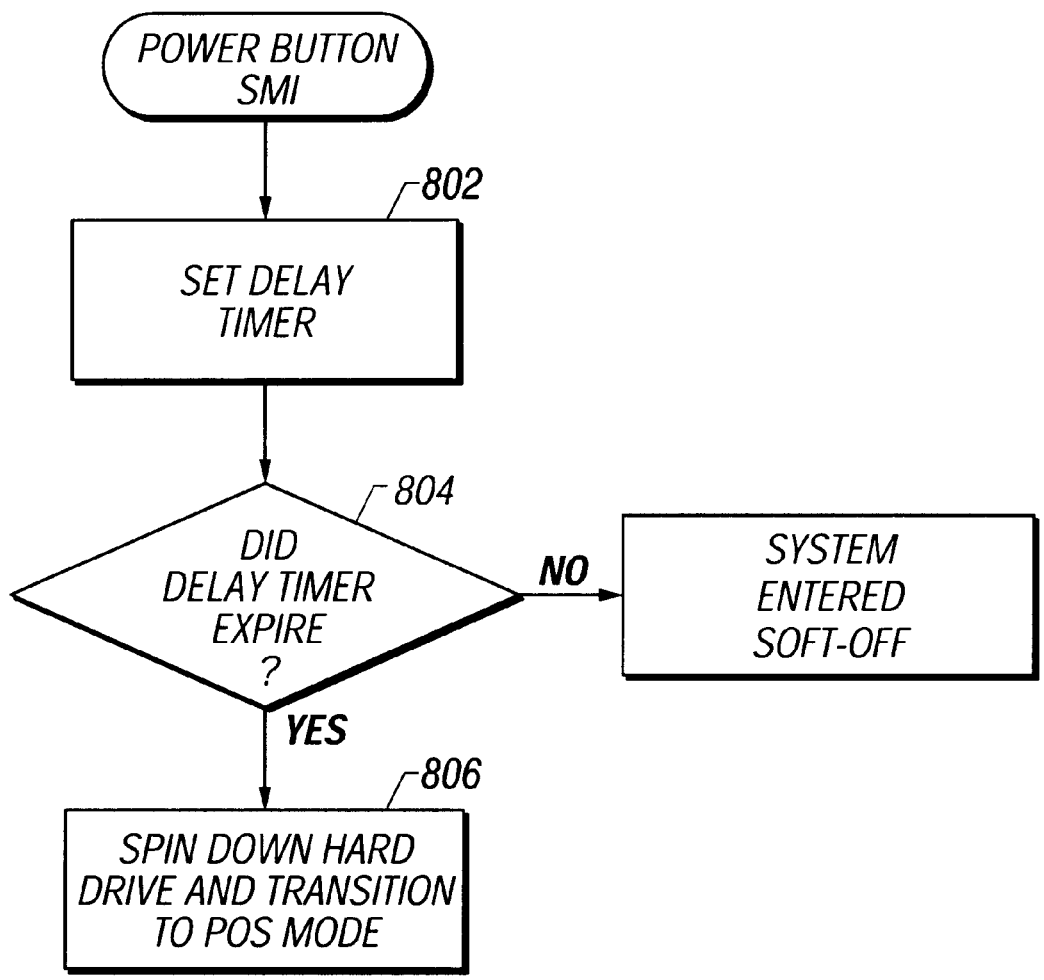
FIG. 9 is a flow diagram of a system management handler for controlling the computer's transition to one of two power savings states in response to activation of a power control button.

Referring to FIG. 9, a delay timer (e.g., which can be set to expire after 4.5 seconds) is used to ensure that the system 8 can transition to a suspend state (Soft-Off state) in response to actuation of the power Bezel button 156 for greater than or equal to the predetermined time period. Upon activation of the power Bezel button 156, the power button SMI handler is invoked and the delay timer 802 is started (step 802). The delay timer is set to expire after, e.g., 4.5 seconds. Such a timer value is used because of the hardware power button override feature of the system management controller 126, which can be set for activation after 4 seconds of POWERBTN_ being active.

The power button SMI handler exits after it has started the delay timer. The power button SMI handler can be re-invoked in one of two ways: the delay timer has expired after about 4.5 seconds; or the hardware power button override mechanism has been activated.

When it is again invoked, the SMI handler checks to determine if the delay timer has expired (step 804). If so, the SMI handler is allowed to transition to the POS state, which includes spinning down the hard disk drive in the system 8. However, if the delay timer has not expired, and it has shut off, then the system 8 has entered Soft-Off state through the power button override mechanism.

By using the features described in connection with FIG. 10, the system 8 is allowed to enter into a suspend power state using a hardware override feature of a power button. This is essentially effected by using the delay timer to give the hardware override mechanism of the system management controller 126 time to be invoked before the system 8 is allowed to enter POS mode. Consequently, more power savings can be achieved in the system 8 in the suspend state compared to other low power states (POS, sleep).

Controlling Computer Functions Using Predefined Control Buttons

In addition to a power Bezel button 156, the computer system 8 can also include other control buttons 195 (which can also be referred to as Bezel buttons), such as a control button to control a CD player (volume, play, etc.), to invoke predetermined applications (e.g., Internet browser), and to perform other predefined functions. These additional Bezel buttons 195 can be located in the same general area on the computer housing as the power Bezel button 156, or they can be separately located.

In one configuration, the Bezel buttons are connected by a serial line to the I/O controller 140 (which can be implemented with the SMC68X or SMC67X part from Standard Microsystems Corporation, for example).

The I/O controller 140 can also receive interrupts from other sources in the computer system 8. These interrupts are routed over a serial interrupt bus 196 from the I/O controller 140 to an interrupt controller (not shown), which can be implemented in either in the PCI-ISA bridge 124 or as a separate part or parts. Thus, the hardware interrupts, including the SMI generated by the I/O controller 140 in response to activation of one of the Bezel buttons 195, share a serial bus.

An SMI generated by the I/O controller 140, such as in response to activation of one of the Bezel buttons 195, has the highest priority among interrupts in the computer system 8. Thus, while an SMI is active, the other interrupts are disabled in the I/O controller 140. Thus, if a user depresses a Bezel button 140 for an extended amount of time (such as pressing a Bezel button to control volume up and down for several seconds), other system interrupts would not be serviced for the duration. A non-SMI interrupt can potentially be disabled. To avoid disabling interrupts for any extended time period, the SMI handler of the computer system 8 cooperates with a timer to allow the SMI handler to exit and re-invoke to allow other interrupts to be serviced.

Figure 10:
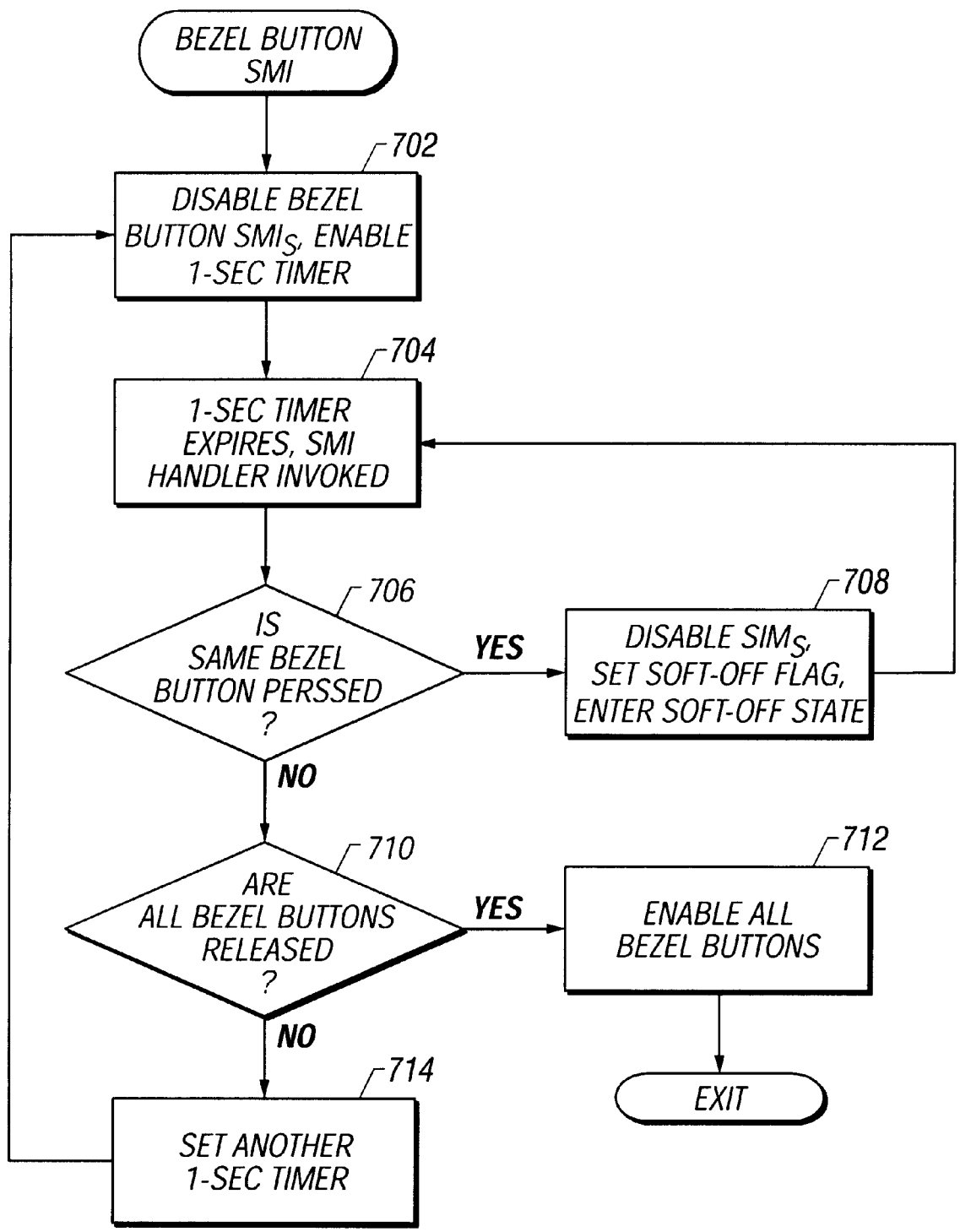
FIG. 10 is a flow diagram of a system management handler that cooperates with a timer to control functions in the computer in response to actuation of predetermined control buttons.

Referring to FIG. 10, when a Bezel button 195 is pushed, a Bezel button SMI handler is invoked. The SMI handler disables all other Bezel button SMIs, referred to as ExtSMIs, and starts an SMI timer that runs for a predetermined period, e.g., 1 second (step 702). The Bezel button SMI handler also generates an NMI (non-maskable interrupt) which invokes an NMI handler. The function of the NMI handler is to determine which of the Bezel buttons 195 by reading the value of a variable in memory that is set by the SMI handler. The NMI handler continues to run even after the SMI handler exits to control the component or application associated with the actuated Bezel button 195.

When the SMI timer expires (after about one second, for example), the Bezel button SMI handler is re-invoked (step 704). After the Bezel button SMI handler is re-invoked, it checks to determine if the same Bezel button 195 is still pressed (step 706). This is done by reading a value set in the I/O controller 140 associated with the particular Bezel button 195. If the same Bezel 195 is still pressed, the SMI handler restarts the SMI timer and exits, leaving all other Bezel buttons 195 disabled (step 708). As long as the same Bezel button 195 is pressed, steps 704, 706, and 708 are repeated.

However, if the same Bezel button 195 is not pressed (step 706), the SMI handler checks to determine if all Bezel buttons have been released (step 710). If all Bezel buttons have been released, then the SMI handler enables all Bezel buttons 195 (ExtSMIs) and exits (step 712).

However, if all Bezel button have not been released (step 710), indicating that another Bezel button has been activated, the SMI handler starts the SMI timer and exits. Steps 704–714 are repeated until all Bezel buttons 195 have been released.

Thus, during actuation of a Bezel button 195 over an extended period of time (e.g., several seconds), an invoked SMI handler is allowed to exit, re-invoking itself after a timer expires. Consequently, other lower priority interrupts can be serviced between activation of the SMI handler.

Other embodiments are also within the scope of the following claims. For example, although specific computer power states have been described, other power states defined by different standards are contemplated. Further, the order of the steps described for the microcontroller firmware, the BIOS routine, and the SMI handler can be varied and still achieve desirable results. In addition, instead of using the PCI-ISA bridge 124, different controller chips can be used to interact with the BIOS routines and SMI handler to control the power state of the computer 8. Also, a different existing wire in the video cable (such as a VGA cable) can be used to route the sleep indication. The SMI handlers described can be associated with the system BIOS (e.g., APM BIOS) or they can be independent routines.

Although the present invention has been described with reference to specific exemplary embodiments, various modifications and variations may be made to these embodiments without departing from the spirit and scope of the invention as set forth in the claims.

What is claimed is:

1. A method of controlling a power state of a computer, the computer being connected by a VGA cable to a monitor having a power control button, the method comprising:

receiving an activation signal over a dedicated wire in the VGA cable in response to actuation of the monitor power control button;

generating a system management interrupt in response to receipt of the activation signal; and invoking a system management interrupt handler to change the power state of the computer, wherein the computer includes an ON state, an intermediate power state, and a suspend state.

2. A computer system, comprising:

a monitor having a power control button;

a power management controller coupled to the monitor, the power management controller being configured to change the power state of the computer system in response to actuation of the monitor power control button;

wherein the power management controller is coupled to the monitor over a video cable; and wherein actuation of the monitor power control button is indicated by a signal transmitted over a dedicated wire of the video cable.

3. The computer system of claim 2, wherein the power management controller includes a bus device.

4. The computer system of claim 3, wherein the bus device includes a PCI-ISA bridge-chip.

5. The computer system of claim 4, wherein the bus device includes a PIIX4 PCI-ISA bridge chip.

6. The computer system of claim 2, wherein the power management controller includes a system management interrupt handler.

7. The computer system of claim 2, wherein the monitor includes a microcontroller configured to enable transmission of the actuation of the monitor power control button over the video cable.

8. The computer system of claim 7, further comprising:

a serial bus cable coupling the monitor and the power management controller, and wherein the microcontroller is further configured to enable transmission of the actuation of the monitor power control button over either the video cable or the serial bus cable.

9. The computer system of claim 8, wherein the serial bus cable includes a Universal Serial Bus cable.

10. The computer system of claim 2, wherein the video cable includes a VGA cable.

11. The computer system of claim 2, wherein the power control button includes a sleep button.

12. The computer system of claim 2, wherein the computer includes at least two of the following states: a suspend state, an intermediate power state, and an ON state.

13. The computer system of claim 12, wherein the suspend state includes a Soft-Off state.

14. The computer system of claim 2, wherein the power management controller is configured to determine the type of monitor, the power management controller enabling the control of the power state of the computer system only when the monitor is determined to be a power control monitor.

15. The computer system of claim 14, wherein the power management controller includes a BIOS routine.

16. The method of claim 2, wherein said video cable is a VGA video cable.

17. The method of claim 16, wherein said dedicated wire is wire 4 of VGA video cable.

18. A power management device for controlling a power state of a computer, the computer being connected to a monitor having a power control button, the power management controller comprising:

a detector coupled to the monitor to detect actuation of the power control button;

a controller configured to change the power state of the computer in response to actuation of the monitor power control button;

wherein the computer is coupled to the monitor over a video cable; and wherein the detector receives an activation signal representing actuation of the monitor power control button over a dedicated wire of the video cable.

19. The power management device of claim 18, wherein the computer includes at least two of the following states: a suspend state, an intermediate power state, and an ON state.

20. The power management device of claim 19, wherein the suspend state includes a Soft-Off state.

21. The method of claim 18, wherein said video cable is a VGA video cable.

22. The method of claim 21, wherein said dedicated wire is wire 4 of VGA video cable.

23. A system, comprising:

a monitor having a sleep button;

a video cable connected to the monitor, wherein the sleep button is actuated by communication over a dedicated line in the video cable; and a computer connected to the video cable, the computer having a power management controller configured to change the power state of the computer in response to the sleep button being actuated by communication over the dedicated line in the video cable.

24. The method of claim 23, wherein said video cable is a VGA video cable.

25. The method of claim 24, wherein said dedicated wire is wire 4 of VGA video cable.

26. A computer system, comprising:

a monitor having a sleep button and a microcontroller, the microcontroller being connected to receive actuation of the sleep button;

a dedicated video cable line connected to the microcontroller, actuation of the sleep button being communicated over the dedicated video cable line;

a power management controller coupled to the dedicated video cable line, the power management controller being configured to transition the computer system to one of an ON state, Sleep state, and Soft-Off state in response to actuation of the sleep button; and a mass storage device accessible by the power management controller.

27. A computer system, comprising:

a monitor;

a power control switch located on the monitor; and a power management controller connected to the monitor to receive actuation of the power control switch, the power management controller being capable of placing the computer system into one of a sleep state and a suspend state.

28. The computer system of claim 27, wherein the power management controller places the computer system into the suspend state if the power control switch is actuated continuously for greater than a predetermined time period.

29. The computer system of claim 28, wherein the power management controller places the computer system into the sleep state if the power control switch is actuated for less than a predetermined time period.

30. The computer system of claim 27, wherein the suspend state includes a Soft-Off state.

31. The computer system of claim 27, wherein the power management controller includes a system management interrupt handler.

32. The computer system of claim 31, wherein the system management interrupt handler is configured to place the computer system into the Sleep state if the power control switch is actuated for less than a predetermined time period and into the suspend state if the power control switch is actuated for greater than the predetermined time period.

33. The computer system of claim 27, wherein the power control switch includes a Bezel power button.

34. A computer system, comprising:

a monitor;

a power control button located on the monitor;

a power controller that transitions the computer system to a low power state and sets a flag in non-volatile memory in response to a predefined event;

a routine that reads the state of the flag when the computer system is restarting from a power off condition to determine whether to transition the computer system in the low power state; and wherein the predefined event includes actuation of the power control button.

35. The computer system of claim 34, wherein the predefined event includes actuation of the power button for more than a predetermined period of time.

36. The computer system of claim 35, wherein the power controller includes a power management component that is responsive to actuation of the power button for a predetermined period of time.

37. The computer system of claim 35, further comprising:

a timer that is started in response to actuation of the power button.

38. The computer system of claim 34, wherein the power controller includes an SMI handler invoked in response to the predefined event, the SMI handler setting the flag.

39. The computer system of claim 34, wherein the predetermined power state includes a Soft-Off state.

40. A method of controlling a power state of a computer, the computer being connected to a monitor over a video cable including wires, the monitor having a power control button, the method comprising:

receiving an activation signal representing actuation of the monitor power control button over a dedicated wire of the video cable; and changing the power state of the computer in response to actuation of the monitor power control button.

41. The method of claim 40, wherein the power control button includes a sleep button.

42. The method of claim 40, wherein the computer includes a suspend state and an ON state.

43. The method of claim 42, wherein the suspend state includes a Soft-Off state.

44. The method of claim 40, wherein the computer includes an intermediate power state and an ON state.

45. The method of claim 44, wherein the intermediate state includes one of a Sleep state and a powered on suspend state.

46. The method of claim 40, wherein the computer includes a suspend state, an intermediate power state, and an ON state.

47. The method of claim 40, wherein said video cable is a VGA video cable.

48. The method of claim 47, wherein said dedicated wire is wire 4 of VGA video cable.

* * * * *